Patented Aug. 16, 1932

1,871,514

UNITED STATES PATENT OFFICE

ERNEST F. GRETHER AND GERALD H. COLEMAN, OF MIDLAND, MICHIGAN, ASSIGNOR TO THE DOW CHEMICAL COMPANY, OF MIDLAND, MICHIGAN, A CORPORATION OF MICHIGAN

AZO-DYES FROM ETHER-ARYLIDES OF AMINO-HYDROXYDIARYLS

No Drawing.   Application filed July 1, 1929.   Serial No. 375,327.

The present invention is concerned with azo dyes of the so-called ice-color or direct-developed type which may be produced by coupling ether-arylides of hydroxy-aromatic acids with diazo or polyazo components, more particularly with dyes prepared from such arylides derived from ethers of amino-hydroxy-diaryls, and still more particularly with dyes of the above type prepared by coupling diazo-components into 2.3-hydroxynaphthoic acid arylides derived from ethers of amino ortho or para-hydroxydiphenyl.

It is known that azo dyes fast to light and washing are produced by coupling diazotized aromatic amines into naphthol AS, the latter being 2.3-hydroxynaphthoic acid anilide, or by using related compounds. We have now discovered that ethers of amino-hydroxy-diaryls may be employed as arylide components, and furthermore that diazotized or polyazotized aromatic amino compounds may be coupled into arylides derived from such amino-ethers and hydroxy-aromatic acids, more particularly 2.3-hydroxy-naphthoic acid, by condensation or other suitable manner, whereby useful azo dyes may be formed. The probable formula of such dyes may be represented as:—

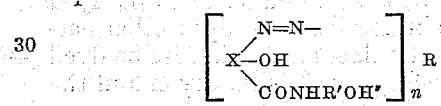

where R represents the residue from a diazotized or polyazotized aromatic amino-compound, R' the residue from an amino-diaryl, R'' an alkyl, aryl or aralkyl group, $n$ is the number of diazotized amino groups in the diazo-component R, and X is the residue from a hydroxy-aromatic acid. The invention, then, consists of the steps and new products hereinafter fully described and particularly pointed out in the claims, the following description setting forth but several of the various ways in which the principle of the invention may be used.

The herein described new azo dyes may be prepared from diazo-components and the above mentioned hydroxy-aromatic acid arylides in any of the ordinary ways. It is immaterial whether the dyes are applied by developing on the fiber, by printing a diazo-solution upon padded goods according to the well-known method, by using nitrosamine salts of the corresponding bases, or are prepared in substance for use as pigments, in which latter case the respective reaction components may be brought together directly, with or without the aid of a diluting or solvent medium, the dye being separated from the reaction mixture by any suitable means. Mordanting or other auxiliary treatment for promoting the absorption of the dye on the fiber, or after-treatment with metallic salts such as chromium, copper or aluminum salts, for fixing the dye or modifying its color tone may be optionally employed in conjunction with the dyeing operation without departing from the spirit of the invention which is intended to include not only the dyes themselves but also material dyed therewith.

A preferred manner in which our invention may be carried out is illustrated in the following specific examples, it being understood that such examples, however, are not to be interpreted as a limitation upon the invention.

Example 1

The 2.3-hydroxynaphthoic acid arylide of 3-amino-4-methoxy-diphenyl is prepared by condensing said acid and amine with the aid of phosphorus trichloride in the presence of toluene in the usual manner whereby the desired arylide forms as a solid phase intermixed with the liquid medium. The purified arylide has a melting point of approximately 201° C.

Cotton yarn is impregnated with a slightly alkaline solution of the above arylide to which may be added advantageously, but not necessarily, formaldehyde and/or other fixative, e. g. Turkey red oil or an aluminum salt. Said yarn is then immersed in a diazo solution derived from 2-amino-diphenylether. The dye develops on the fiber, and has a scarlet color, the probable formula being:—

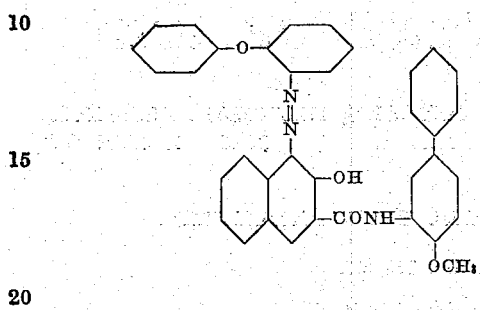

Example 2

In a manner similar to that described in Example 1, tetrazotized benzidine is coupled into the same arylide, the dyes developing on the fiber, being of a violet blue color and having the probable formula:—

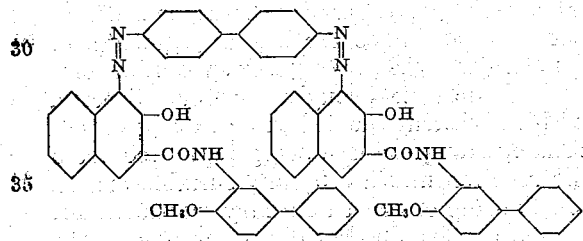

Example 3

The 2.3-hydroxynaphthoic acid arylide of 3-amino-4-ethoxy-diphenyl (M. P. 210° C.) is prepared and coupled with tetrazotized 4.4'-diamino-diphenyl-ether. The dyes which is developed on the fiber, is bluish rose-red in color and has the probable formula:—

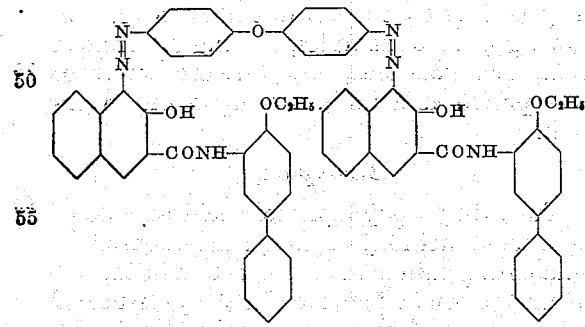

Example 4

The 2.3-hydroxynaphthoic acid arylide of 5-amino-2-methoxy-diphenyl (M. P. approximately 193° C.) is prepared and coupled with diazotized ortho-nitro-para-phenetidine.

The dye is reddish violet in color and has the probable formula:—

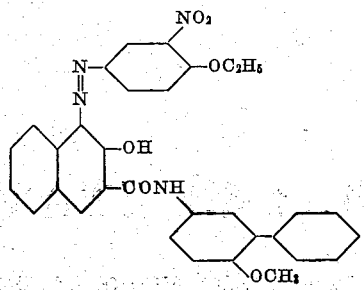

Example 5

Dianisidine is tetrazotized and coupled into the arylide prepared in Example 4. The developed dye is blue and has the probable formula:—

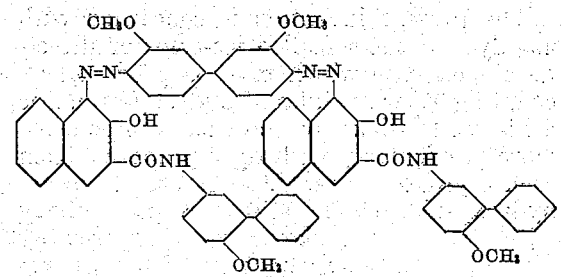

In a similar fashion we have prepared other dyes of the same general type from the above mentioned arylides by coupling thereinto other diazotized or polyazotized aromatic amino compounds, e. g. meta-nitraniline, amino-naphthyl-phenyl-ether, orthochlor-para-nitro-aniline, ortho-amino-diphenyl-ether, para-amino-acetanilide, alpha-naphthylamine, 3-4-dichloraniline, ortho-nitro-para-phenetidine, dianisidine, diamino-diphenyl-ether, benzidine, para-chlor-ortho-toluidine, amino-azobenzene and other amino-azo-compounds.

The colors of the dyes of the present invention vary from orange to blue, depending on the specific diazo-component employed.

While in the examples, cotton fibers have been referred to as the material to be dyed with the hereindescribed new dyes, other natural or synthetic fibers may likewise be dyed therewith, such as wool, silk, rayon and the like.

Furthermore, we do not limit the invention to the use of the specifically aforementioned intermediates. As diazo-components, any diazotized or polyazotized aromatic amino- or poly-amino- compounds or their substitution products or derivatives suitable for use in preparing azo-dyes, may be employed for coupling into the arylides of the type hereindescribed.

As azo-components into which the above-mentioned diazo-components may be coupled, arylides derived from other amino-ethers may be utilized, i. e. alkyl, aryl or aralkyl ethers of amino-hydroxydiaryls or their substitution products, such as the halogen, nitro or other derivatives. Other hydroxy-aromatic acids than those specifically herein mentioned, or their substitution products, e. g. halogen, nitro or alkyl derivatives, likewise may be employed as arylide components. In other words, our invention in its broader aspects covers arylides of the general formula:—

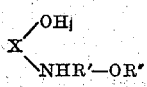

wherein X represents the residue from a hydroxy-aromatic acid, R' the residue from an amino-diaryl and R'' an alkyl, aryl or aralkyl group, as well as azo dyes derived therefrom.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. A process for the manufacture of new azo dyes which comprises coupling an alkyl ether of a 2.3-hydroxy-naphthoyl-amino-hydroxydiphenyl of the general formula:—

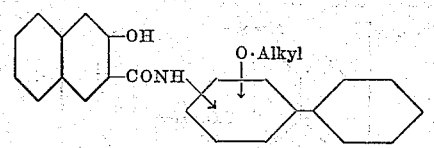

with a diazotized aromatic amino compound.

2. As new products, the herein described azo-dyes probably having the general formula:—

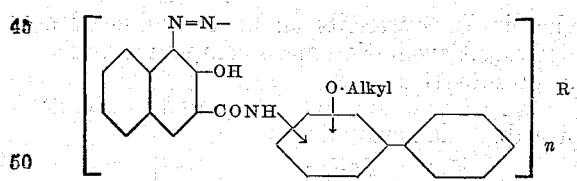

wherein R represents an aromatic residue from a diazotized aromatic amino compound and $n$ is the number of azo groups linked with R.

3. As a new product, an azo dye produced by coupling any diazotized aromatic amino compound into an arylide prepared by condensing equi-molecular ratios of a hydroxy naphthoic acid and an amino-diphenyl, the latter compound being substituted by an alkoxy group in the same ring as the amino group.

4. A process for the manufacture of new azo dyes which comprises coupling an arylide of 2.3-hydroxy-naphthoic acid, having probably the general formula

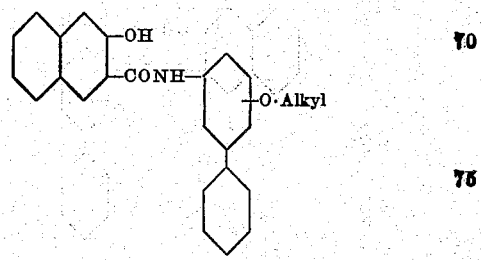

with a diazotized aromatic amino compound.

5. A process for the manufacture of new azo dyes which comprises coupling an arylide of 2.3-hydroxy-naphthoic acid, having probably the formula

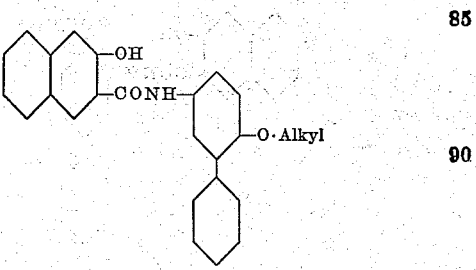

with a diazotized aromatic amino compound.

6. A process for the manufacture of new azo dyes which comprises coupling an arylide of 2.3-hydroxy-naphthoic acid, having probably the formula

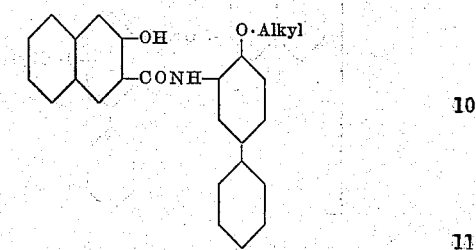

with a diazotized aromatic amino compound.

7. A process for the manufacture of new azo dyes which comprises coupling an arylide of 2.3-hydroxy-naphthoic acid, having probably the formula

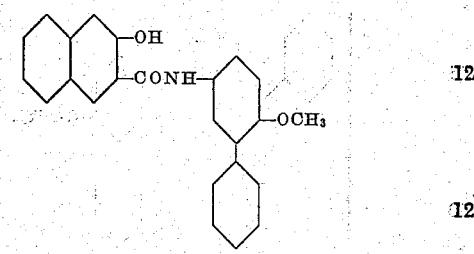

with a diazotized aromatic amino compound.

8. A process for the manufacture of new azo dyes which comprises coupling an arylide of 2.3-hydroxy-naphthoic acid, having probably the formula

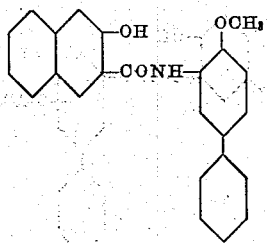

with a diazotized aromatic amino compound.

9. A process for the manufacture of new azo dyes which comprises coupling an arylide of 2.3-hydroxy-naphthoic acid, having probably the formula

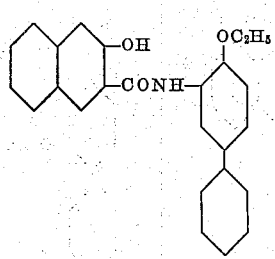

with a diazotized aromatic amino compound.

10. As a new product, an azo dye having probably the general formula

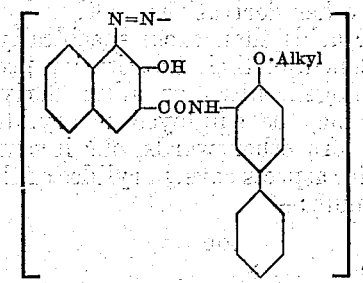

wherein R represents an aryl residue of a diazotized aromatic amino compound and $n$ is the integer 1 or 2.

11. As a new product, an azo dye having probably the formula

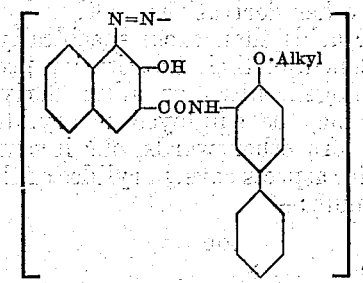

wherein R represents an aryl residue of a diazotized aromatic amino compound and $n$ is the integer 1 or 2.

12. As a new product, an azo dye having probably the formula

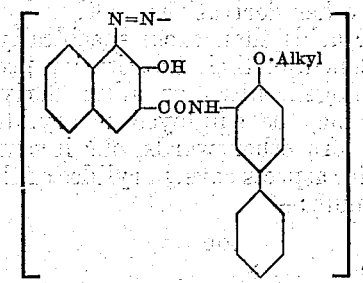

wherein R represents an aryl residue of a diazotized aromatic amino compound and $n$ is the integer 1 or 2.

13. As a new product, an azo dye having probably the formula

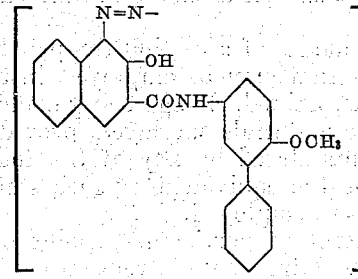

wherein R represents an aryl residue of a diazotized aromatic amino compound and $n$ is the integer 1 or 2.

14. As a new product, an azo dye having probably the formula

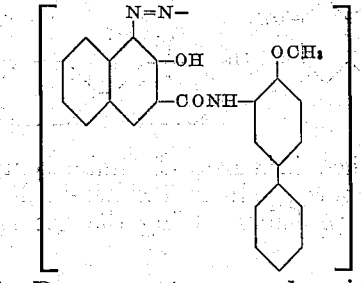

wherein R represents an aryl residue of a diazotized aromatic amino compound and $n$ is the integer 1 or 2.

15. As a new compound, an azo dye having probably the formula

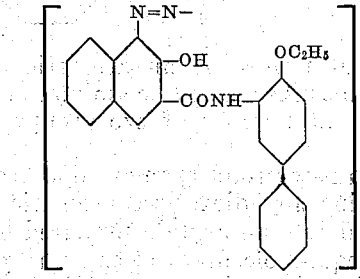

wherein R represents an aryl residue of a diazotized aromatic amino compound and $n$ is the integer 1 or 2.

Signed by us this 28 day of June, 1929.

ERNEST F. GRETHER.
GERALD H. COLEMAN.

Certificate of Correction

Patent No. 1,871,514. August 16, 1932.

ERNEST F. GRETHER ET AL.

It is hereby certified that error appears in the printed specification of the above-numbered patent requiring correction as follows: Page 1, lines 29 to 32, strike out the formula and insert instead:

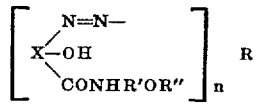

page 2, line 43, for " dyes " read *dye;* and that the said Letters Patent should be read with these corrections therein that the same may conform to the record of the case in the Patent Office.

Signed and sealed this 25th day of October, A. D. 1932.

[SEAL.]

M. J. MOORE,
*Acting Commissioner of Patents.*